(12) United States Patent
Dallet et al.

(10) Patent No.: US 10,579,133 B2
(45) Date of Patent: Mar. 3, 2020

(54) CONTROL MODULE FOR HUMAN-MACHINE DIALOGUE SYSTEM

(71) Applicant: Schneider Electric Industries SAS, Rueil-Malmaison (FR)

(72) Inventors: Herve Dallet, Soyaux (FR); Francis Chauvet, Mouthiers (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/132,673

(22) Filed: Sep. 17, 2018

(65) Prior Publication Data

US 2019/0094953 A1 Mar. 28, 2019

(30) Foreign Application Priority Data

Sep. 25, 2017 (FR) ...................... 17 71013

(51) Int. Cl.
| | | |
|---|---|---|
| *G10L 21/00* | (2013.01) | |
| *G06F 3/01* | (2006.01) | |
| *G06F 3/02* | (2006.01) | |
| *G06F 3/023* | (2006.01) | |
| *G05B 19/05* | (2006.01) | |
| *G05F 1/46* | (2006.01) | |
| *G06F 1/26* | (2006.01) | |
| *G06F 13/10* | (2006.01) | |
| *G08B 5/36* | (2006.01) | |
| *G10L 25/00* | (2013.01) | |
| *H01H 13/83* | (2006.01) | |
| *H01H 13/02* | (2006.01) | |

(52) U.S. Cl.
CPC .............. *G06F 3/01* (2013.01); *G05B 19/05* (2013.01); *G05F 1/468* (2013.01); *G06F 1/26* (2013.01); *G06F 3/0202* (2013.01); *G06F 3/023* (2013.01); *G06F 3/0227* (2013.01); *G06F 13/10* (2013.01); *G08B 5/36* (2013.01); *H01H 13/023* (2013.01); *H01H 13/83* (2013.01)

(58) Field of Classification Search
CPC ........ G06F 3/01; G06F 3/0227; G06F 3/0202; G06F 3/023; G06F 1/26; G06F 13/10; G05B 19/05; G05B 19/054; G05B 2219/1105; G05F 1/468; G08B 5/36; H01H 13/83; H01H 13/023
USPC ....................................................... 704/275
See application file for complete search history.

(56) References Cited

U.S. PATENT DOCUMENTS

2016/0125708 A1  5/2016  Fruchard et al.

FOREIGN PATENT DOCUMENTS

EP  3 035 166 A1  6/2016

OTHER PUBLICATIONS

French Preliminary Search Report dated May 29, 2018 in French Application 17 71013 filed on Sep. 25, 2017 (with English Translation of Categories of Cited Documents and Written Opinion).

*Primary Examiner* — Thierry L Pham
(74) *Attorney, Agent, or Firm* — Oblon, McClelland, Maier & Neustadt, L.L.P.

(57) ABSTRACT

A control module for a human-machine dialogue system, the system including a plurality of human-machine dialogue members, each human-machine dialogue member including a functional element that includes at least one electrical contact and/or a signalling indicator. The control module is configured to operate in a write mode to attribute a state to each signalling indicator of each human-machine dialogue member and in a read mode to read a state of the electrical contact of each human-machine dialogue member.

11 Claims, 5 Drawing Sheets

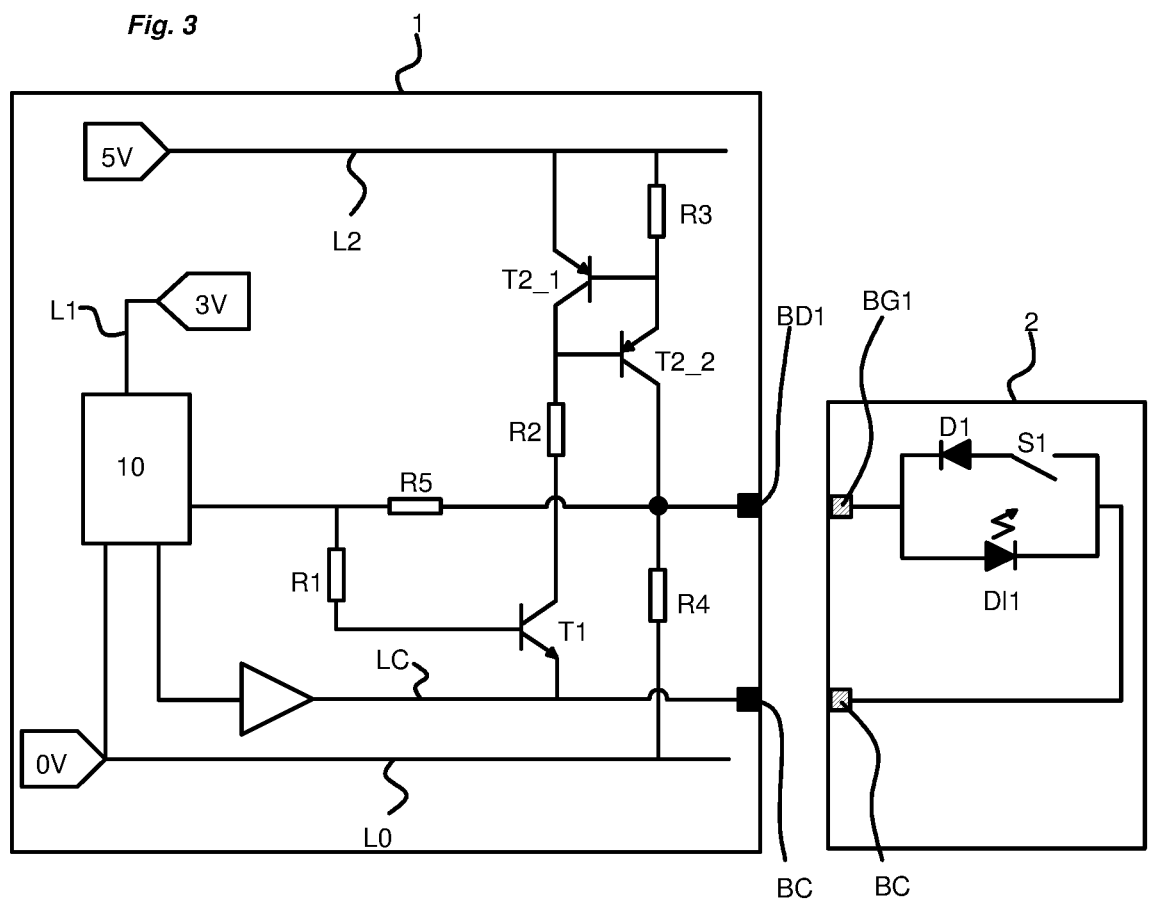

CONTROL MODULE FOR HUMAN-MACHINE DIALOGUE SYSTEM

TECHNICAL FIELD OF THE INVENTION

The present invention relates to a control module for a human-machine dialogue system possessing a plurality of removable and interchangeable human-machine dialogue members and to the human-machine dialogue system incorporating said control module.

PRIOR ART

A human-machine dialogue system is already known from the patent application EP3035166A1. This patent application describes a solution comprising a master module and a plurality of human-machine dialogue members that are connected to said master module. Each human-machine dialogue member includes a functional element comprising at least one signalling indicator and/or at least one electrical contact. To control the signalling indicator and to read the state of the electrical contact, which are connected in parallel in one and the same functional element, the master module implements an asynchronous control in which it alternates periods referred to as write periods, during which in controls the state of the signalling indicator, with periods referred to as read periods, during which it verifies the state of the electrical contact of the member. During a read period, the master module applies a voltage of a first sign to read the state of the electrical contact and, during a write period, the master module applies a voltage of opposite sign to control the activation or deactivation of the indicator.

Although this control solution has proven to be satisfactory, it might not be suited to the operating constraints of the various components that are used.

An object of the invention is therefore to provide a control module that makes it possible for the human-machine dialogue system to operate in a way that is suited to the constraints of the system.

SUMMARY OF THE INVENTION

This object is achieved by a control module for a human-machine dialogue system, said system including a plurality of human-machine dialogue members, each human-machine dialogue member comprising a functional element that includes at least one electrical contact and/or a signalling indicator. Said control module comprises a microcontroller that is designed to be connected to a first power supply source, a common line that is designed to link the microcontroller to all of the functional elements and a plurality of control lines, each designed to link the microcontroller to a functional element of a distinct human-machine dialogue member. Said control module is configured to operate in a write mode to attribute a state to each signalling indicator of each human-machine dialogue member and in a read mode to read a state of the electrical contact of each human-machine dialogue member.

Said write mode is applied by placing said common line at a first electrical potential and said read mode is applied by placing said common line at a second electrical potential, distinct from the first electrical potential. The control module is characterized in that it includes, for each control line of a human-machine dialogue member, at least one power supply block that is designed to be linked to a second power supply source and connected to said control line of said human-machine dialogue member. Said microcontroller is thus configured to activate or to deactivate each power supply block in said write mode by changing the electrical potential assigned to the associated control line and to read the state of the electrical contact of each human-machine dialogue member on the associated control line in said read mode.

According to one particularity, the power supply block includes a current generator and a control block for controlling said current generator, connected between the current generator and the associated control line.

According to another particularity, the control block includes a transistor having a base that is connected to the control line via a resistor.

According to another particularity, the current generator is connected between two power supply lines forming the second power supply source, a first power supply line at nonzero potential and a reference line at zero potential.

According to another particularity, the control module includes a pull-down resistor that is connected to the control line and to the reference line.

According to another particularity, the microcontroller is connected to said reference line and to a second power supply line, forming the first electrical power supply source.

According to another particularity, the control module includes a resistor, referred to as the read resistor, placed in series on the control line.

The invention also relates to a human-machine dialogue system comprising a control module and a plurality of human-machine dialogue members that are connected to said control module, each human-machine dialogue member comprising a functional element provided with an electrical contact and/or a signalling indicator, between a first terminal that is connected to a common line and a second terminal that is connected to a distinct control line generated by said control module, said control module being such as defined above.

According to one particularity, the human-machine dialogue members are connected to said control module by twisted wiring.

According to another particularity, the indicator is a light indicator and includes at least one light-emitting diode.

According to another particularity, each human-machine dialogue member includes a diode that is connected in series with an electrical contact when the latter is present.

BRIEF DESCRIPTION OF THE FIGURES

Other features and advantages will appear in the following detailed description, given with reference to the appended drawings, which are listed below:

FIG. 3 shows a control module according to the invention associated with a human-machine dialogue member; in this figure, to simplify the diagram, only one control line is shown;

DETAILED DESCRIPTION OF AT LEAST ONE EMBODIMENT

Figure 1:
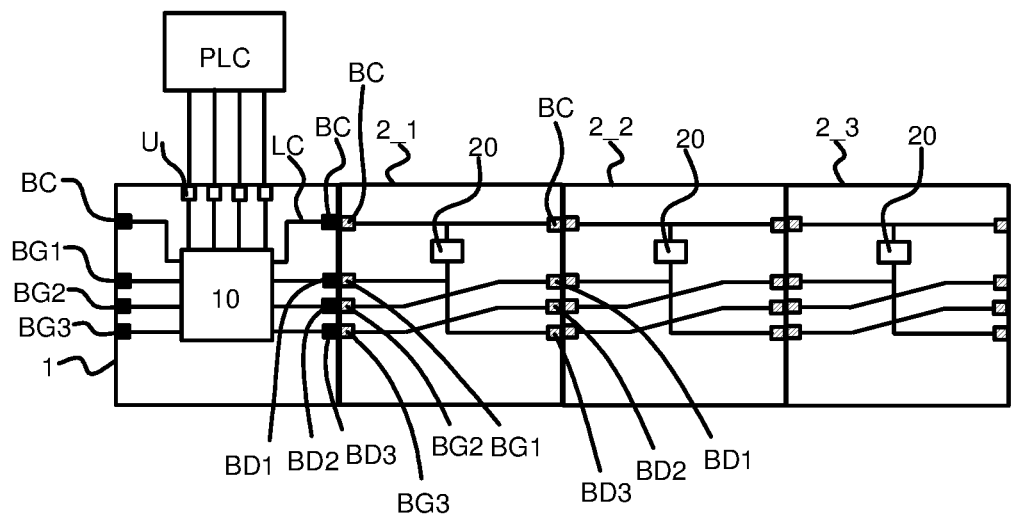
FIG. 1 schematically shows a human-machine dialogue system according to the invention.

A human-machine dialogue system according to the invention and shown in FIG. 1 includes a main control module 1 and a plurality of human-machine dialogue members 2_1, 2_2, 2_3 (generally referenced 2).

The control module 1 may be connected to a programmable logic controller (PLC).

The link from the control module to the programmable logic controller may be wired (as in FIG. 1) or wireless.

The communication protocol applied between the control module 1 and the programmable logic controller PLC may be of any type, for example Bluetooth, Wi-Fi, Ethernet, or other known protocols, such as industrial protocols.

The control module 1 includes a microcontroller 10 allowing the state of each human-machine dialogue member 2 to be read and written and an interconnection block that is designed to address each human-machine dialogue member 2 individually. The interconnection block and the microcontroller 10 may be held together within one and the same housing or separately via a wired or wireless link, the intelligence of the microcontroller 10 potentially being remote with respect to the interconnection block.

To operate, the microcontroller 10 is designed to be connected to a first power supply source delivering a first voltage, for example 3 V (generated between a line L1 at a potential of 3 V and a reference line L0 at 0 V).

The first power supply source may be incorporated within the housing of the control module 1 and form part of the control module.

Throughout the rest of the description, the use of the expression "control module" should be considered as covering both possible architectures. In the appended figures, the control module is shown in the form of a single housing incorporating the interconnection block and the microcontroller 10.

The control module 1 includes at least one common electrical contact terminal BC that is connected to the microcontroller (potentially via a buffer to increase the power of the signal) by a common line LC.

Figure 2:
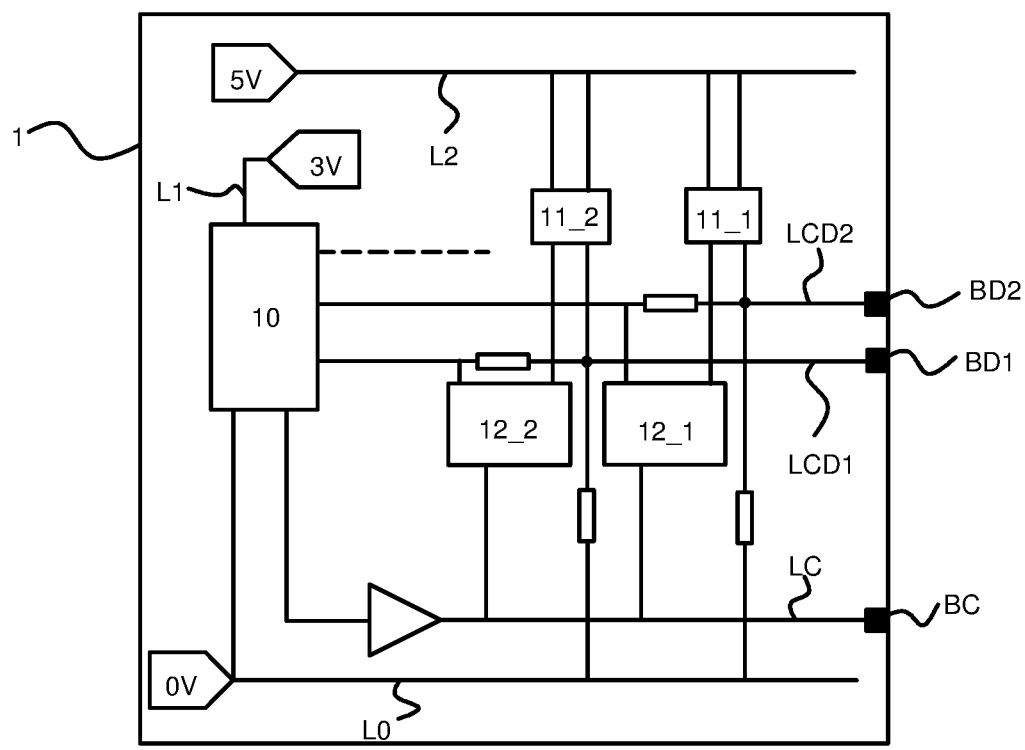
FIG. 2 schematically shows a control module according to the invention; in this figure, only two control lines are shown.

It may also include a series of electrical contact terminals, referred to as downstream contact terminals BDi, i ranging from 1 to n (where n is greater than or equal to 2—in particular n=3 in the example of FIG. 1), which are each connected to the microcontroller by a distinct control line. The control module may also include a series of upstream contact terminals BGi (see FIG. 1), with i ranging from 1 to n (where n is greater than or equal to 2—in particular n=3 in the example of FIG. 1), which are each connected to the microcontroller by a distinct control line LCD1, LCD2. Depending on the position of the control module in the system, at the front, at the back or inserted between two human-machine dialogue members, either/both the upstream or/and downstream contact terminals will be used. In FIG. 1, the control module is placed at the front of the system, hence only the upstream contact terminals thereof are used. Other architectures are in particular presented in the patent application EP3035166A1 already cited above. In FIG. 2, only two downstream terminals BD1, BD2 and the common terminal BC have been represented, allowing two human-machine dialogue members to be connected. In FIGS. 3 to 5B, to explain the principle of the invention, only one contact terminal BD1 and the common terminal are shown. The common line LC is then associated with the control terminal and the control line LCD1 is associated with the contact terminal BD1.

Each human-machine dialogue member is connected between the common line and a distinct control line, dedicated to controlling the human-machine dialogue member.

The control module 1 may also include terminals U (FIG. 1) allowing it to be linked to a central control system, for example to the programmable logic controller (PLC) mentioned above, via a wired link. These terminals are also connected to the microcontroller 10. One or more wireless communication modules may also be incorporated within the control module or connected thereto, and controlled by the microcontroller so as to exchange data outwards through the use of a communication protocol.

In general, the control module 1 according to the invention is used to monitor and to control one or more human-machine dialogue members 2. The human-machine dialogue members are advantageously all identical.

Each human-machine dialogue member 2 includes a housing, a common terminal and a plurality of terminals, referred to as upstream terminals BGi (where i is comprised between 1 and n and n is greater than or equal to 2–n=3 in the appended figures), and a plurality of terminals, referred to as downstream terminals BDi (where i is comprised between 1 and n and n is greater than or equal to 2–n=3 in the appended figures). Each human-machine dialogue member 2 also includes a functional element 20 composed of an electrical contact S1 and/or a signalling indicator. This means that a functional element 20 may include either an electrical contact or a signalling indicator or both an electrical contact and a signalling indicator. The signalling indicator may be of any type, i.e. a light, vibrating, sound, etc. indicator. Throughout the rest of the description and in the figures, the signalling indicator will be for example a light indicator DI1. The light indicator may be formed of one or more light-emitting diodes.

Throughout the rest of the description, the focus will be on the particular case of controlling a functional element that includes both an electrical contact S1 and a signalling indicator (a light indicator DI1) connected in parallel. Of course, it should be understood that the solution described below could be applied to a simpler functional element, including only one electrical contact S1 or only one signalling indicator.

According to one particular aspect of the invention, the human-machine dialogue members 2 include no intelligence (microprocessor, electronic circuit or the like) and include only, housed in their housing, this basic functional element and a suitable connection system complying with the twisted wiring mentioned above.

With reference to the appended figures, in each human-machine dialogue member 2, the electrical contact S1 and the light indicator DI1 in parallel are connected to the common terminal BC, to the terminal BG1 and to the terminal BDn (BD3 in FIG. 1). Each of the other terminals BGi (where i is greater than or equal to 2) is linked directly to the terminal BDi-1 of this dialogue member, so as to allow the signals to be conveyed from one member to another.

A diode D1 is connected in series with the electrical contact S1 so as allow the current to flow through the electrical contact S1 in one direction only.

According to the position of the human-machine dialogue member with respect to the control module 1, it will be addressed by a distinct control line of the control module 1. Its position with respect to the control module 1 corresponds to its address. The human-machine dialogue member 2 therefore requires no addressing configuration.

In one variant embodiment of the invention (not shown), the functional elements 20 of the human-machine dialogue members are separated from the connection portion and each human-machine dialogue member may be physically connected to another human-machine dialogue member, which is not necessarily adjacent thereto, by a multiconductor cable.

All of the human-machine dialogue members 2 are physically linked to one another and to the control module 1, either directly or through other, adjacent dialogue members, such that the state and monitoring signals of each of these members may be exchanged directly with the control module 1. The common terminal of each human-machine dialogue member is connected to the common line LC of the control module and, by virtue of the twisted wiring described above and produced by the assembly of modules, each human-machine dialogue member is addressable, by the control module 1, via a point-to-point link through a distinct control line. The human-machine dialogue members 2 may receive commands from the microcontroller 10, regardless of their respective positions in relation to the control module 1.

According to the invention, the control module 1 is also arranged to read and to write the state of each functional element 20 of the human-machine dialogue members 2 that are connected thereto.

For a human-machine dialogue member 2, the functional element of which includes at least one electrical contact S1 and a light indicator DI1 that are connected in parallel between the same terminals, the read and write operations cannot be performed at the same time.

The control module 1 is thus configured to apply and to implement, for each human-machine dialogue member 2, a write mode and a read mode.

In write mode, the control module 1 allows the light indicator of the addressed human-machine dialogue member to be activated or deactivated.

In read mode, the control module 1 is configured to read the state of the electrical contact of each human-machine dialogue member.

For each human-machine dialogue member 2, the control module 1 includes an associated power supply block.

The power supply blocks may be housed in the housing of the control module.

Each power supply block is controlled by the microcontroller 10, to activate or to deactivate the light indicator DI1 of the associated human-machine dialogue member 2.

A power supply block is designed to be connected to a second power supply source delivering a second voltage, distinct from the first voltage, for example equal to 5 V (generated between a line L2 at a potential of 5 V and the reference line L0 at 0 V).

The second power supply source may be incorporated within the housing of the control module 1 and form part of the control module.

Each power supply block includes a current generator 11 and a control block 12 for controlling said current generator. In FIG. 2, two power supply blocks are shown for each of the two control lines LCD1 and LCD2. The first power supply block thus includes its current generator 11_1 and an associated control block 12_1 and the second power supply block includes its own current generator 11_2 and an associated control block 12_2.

In each power supply block, with reference to FIG. 3, the current generator 11 may include two transistors T2_1 and T2_2 and two resistors R2 and R3. The two transistors may be PNP transistors.

The first transistor T2_1 is arranged such that:
its emitter terminal is connected to the power supply line L2 of the second power supply source;
its collector terminal is connected to the control block via the resistor R2;
its base is connected to the power supply line via the resistor R3.

The second transistor T2_2 is arranged such that:
its emitter terminal is connected to the base of the transistor T2_1;
its collector terminal is connected to the control line LCD1;
its base is connected to the collector terminal of the transistor T2_1.

The control block includes a transistor T1. This transistor T1 may be an NPN transistor.

The transistor T1 is arranged such that:
its collector terminal is connected to the resistor R2;
its emitter terminal is connected to the common line LC;
its base is connected to the control line LCD1 via a resistor R1 included within the control block.

A resistor R5 is connected in series on the control line.

The resistor R1 allows the transistor T1 to be controlled when a sufficient voltage is applied to the base.

The resistor R5 is a read resistor allowing a read voltage to be generated when reading the state of the electrical contact S1 in read mode.

A resistor R4 is connected between the control line LCD1 and the reference line L0 at 0 V. It forms a resistor referred to as a pull-down resistor.

To switch from read mode to write mode and vice versa, the microcontroller 10 changes the potential applied to the common line LC. As described above, the read mode and the write mode cannot be applied at the same time. The read mode will be applied for a particularly short duration with respect to the write mode, the light indicator DI1 having to be deactivated during this read mode. The write mode will take up 50% to 90% of the overall duration (overall duration=duration in read mode+duration in write mode).

The principle of the invention is described below in conjunction with the appended figures, for controlling a single human-machine dialogue member. The various potentials that are generated are indicated in the figures described below, according to the operating mode that is applied.

By way of example, the following data have been used:
R1=10 kOhms, R2=10 kOhms, R3=47 Ohms, R4=6 kOhms, R5=40 kOhms Write Mode—Electrical Contact Open—FIGS. 4A and 4B To apply the write mode, the microcontroller 10 sets the potential of the common line to 0 V.

In this configuration, the microcontroller 10 may control the activation or deactivation of the light indicator DI1 by applying a potential of 0 V (or 3 V) to the control line LCD1 of the human-machine dialogue member. The control line is therefore used by the microcontroller for a write operation, which assigns a given potential thereto to apply the write mode.

Figure 4A:
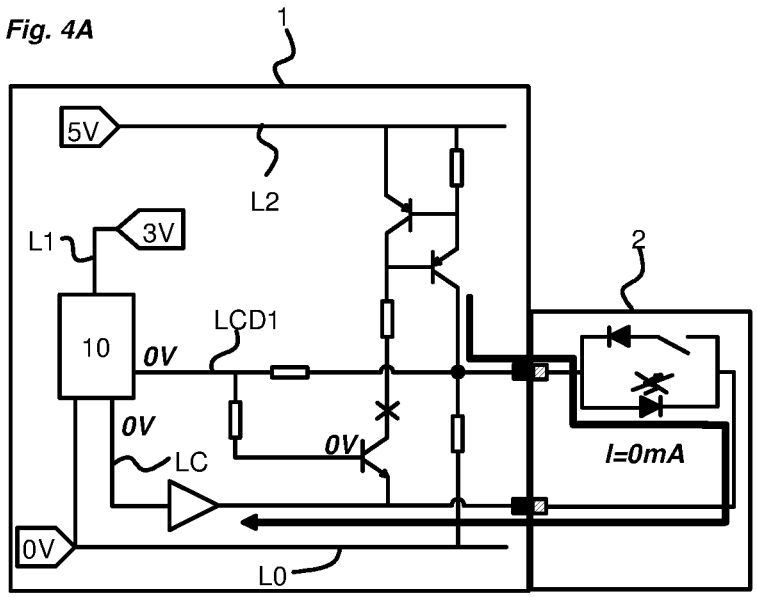
FIGS. 4A to 4D show the various operating cases of the system in write mode.

In FIG. 4A, a zero voltage (at 0 V) is thus generated between the control line LCD1 and the common line LC. The transistor T1 is inactive, rendering the current generator 12 inoperative. No current therefore flows through the light indicator DI1, which remains off.

Figure 4B:
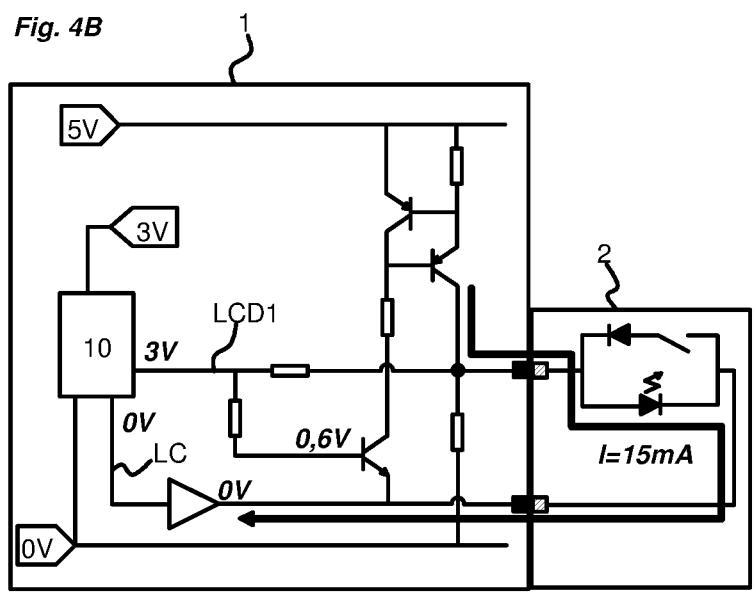

In FIG. 4B, a voltage equal to 3 V is generated between the control line LCD1 and the common line LC. By virtue of the resistor R1, a sufficient command is applied to the base of the transistor T1, resulting in its activation and hence the triggering of the current generator 11.

The current generator 11 then delivers a sufficient current from the second power supply source to result in the activation of the light indicator.

Figure 4C:
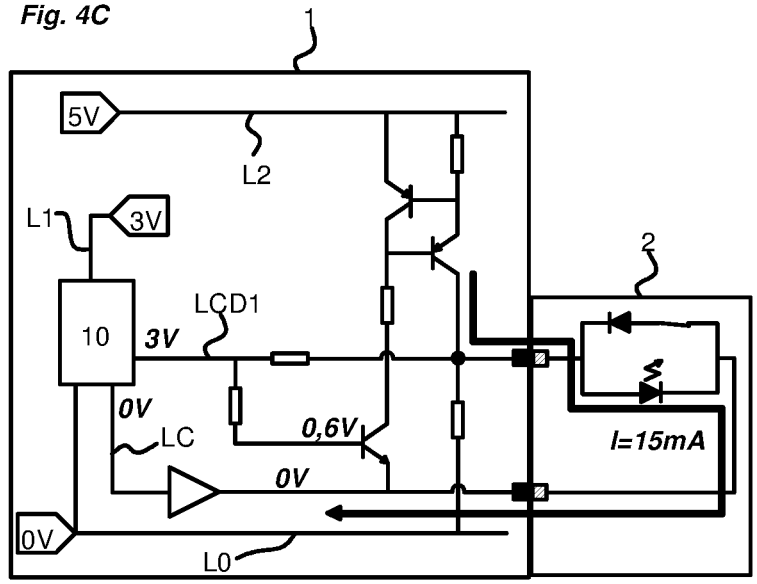
Figure 4D:
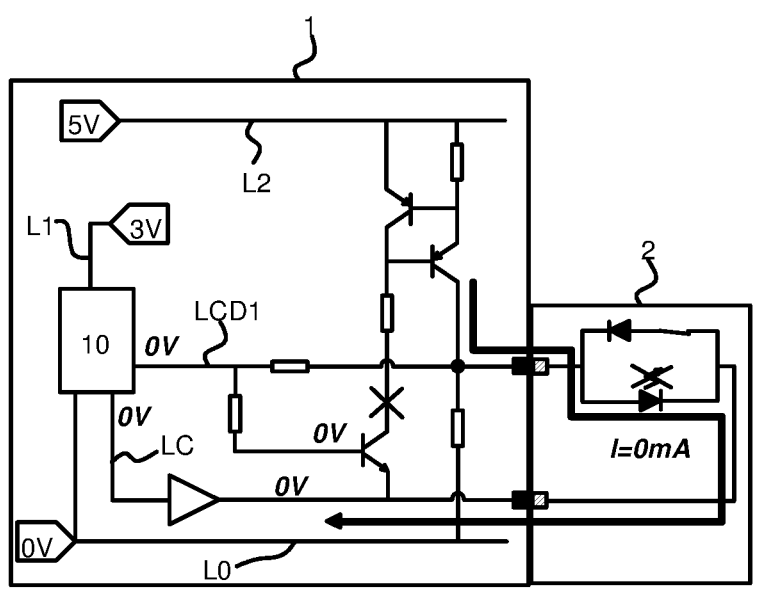

Write Mode—Electrical Contact Closed—FIGS. 4C and 4D

In this configuration, the operating principle is identical to the last.

Even if the electrical contact S1 is closed, the diode D1 positioned in series with the contact prevents the current from flowing therethrough (thus making it possible to avoid shorting the light indicator DI1 and hence interfering with the write mode).

Figure 5A:
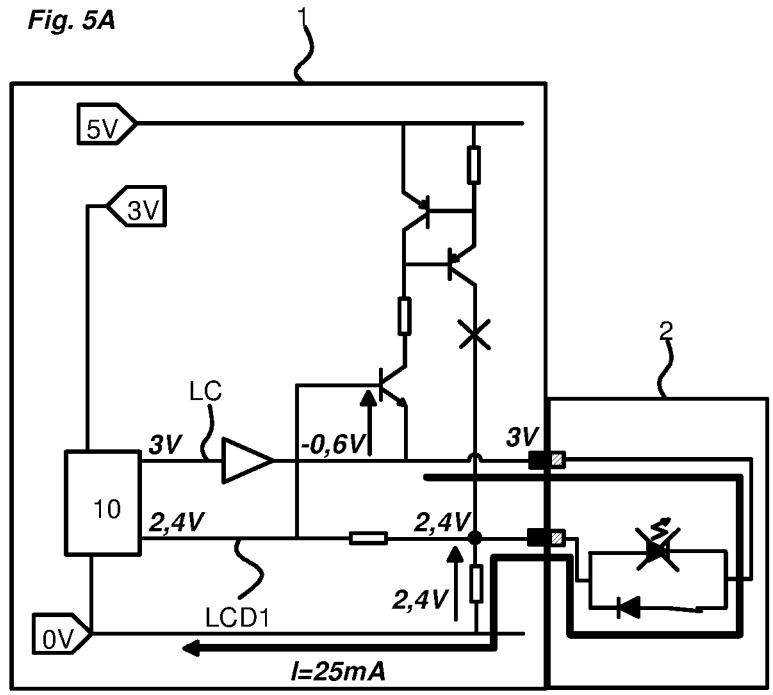
FIGS. 5A and 5B show the various operating cases of the system in read mode; in these figures, to understand the invention better, the diagram is inverted to keep the same referencing conventions.
Figure 5B:
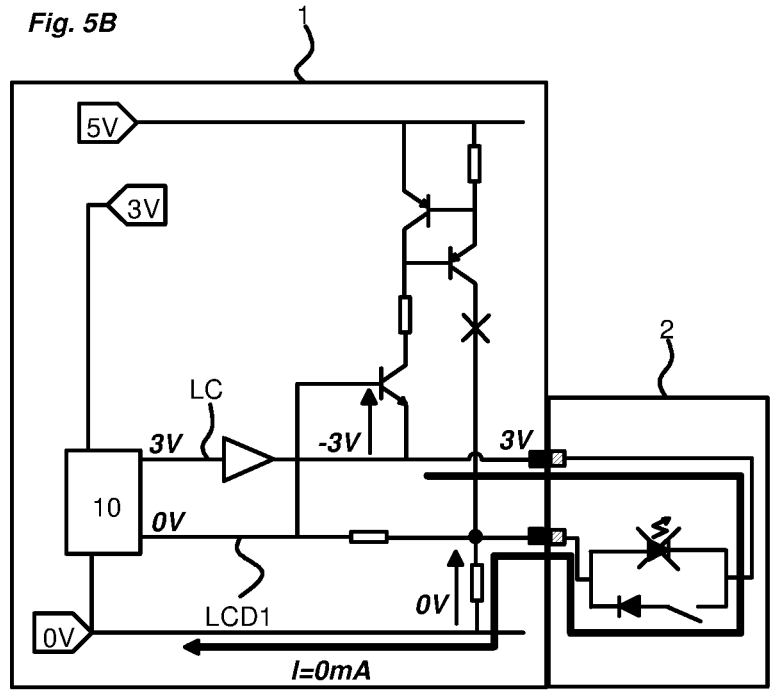

Read Mode—Indicator Off—FIGS. 5A and 5B

To apply the read mode, the microcontroller 10 changes the potential of the common line. From the first power supply source, it sets the potential of the common line to 3 V.

The voltage between the control line and the common line is then −3 V. The emitter terminal of the transistor T1 is then at the potential of −3 V, which does not allow the current generator 11, and hence the light indicator DI1, to be activated.

In read mode, the control terminal is then in input configuration, i.e. suitable for reading by the microcontroller, which will read the potential obtained over the control line when switching to read mode.

According to the potential received over this input, the microcontroller 10 determines whether the contact is open or closed.

A potential of 0 V generated on the control line LCD1 and received by the microcontroller 10 over its corresponding input means that the electrical contact S1 is open.

A potential of 2.4 V generated on the control line LCD1 and received by the microcontroller 10 over the corresponding input means that the electrical contact S1 is closed. A loss of 0.6 V is caused by the diode D1 connected in series with the electrical contact S1.

It is understood from the above description that the system and its adapted control module 1 present certain advantages, among which:
- a simple system possessing simple human-machine dialogue members 2, without intelligence and all alike, regardless of the function that is employed (electrical contact and/or signalling light);
- a control module 1 allowing the human-machine dialogue members to be managed reliably and be means of a simple control process, while using a minimum of wiring.

The invention claimed is:

1. A control module for a human-machine dialogue system, said system comprising a plurality of human-machine dialogue members, each human-machine dialogue member comprising a functional element that includes at least one electrical contact and/or a signalling indicator;
said control module that is designed to be connected to a first power supply source, a common line that is designed to link the microcontroller to all of the functional elements and a plurality of control lines, each designed to link the microcontroller to a functional element of a distinct human-machine dialogue member;
said control module being configured to operate in a write mode to attribute a state to each signalling indicator of each human-machine dialogue member and in a read mode to read a state of the electrical contact of each human-machine dialogue member;
said write mode being applied by placing said common line at a first electrical potential and said read mode being applied by placing said common line at a second electrical potential, distinct from the first electrical potential,
wherein the control module includes:
for each control line of a human-machine dialogue member, at least one power supply block that is designed to be linked to a second power supply source and connected to said control line of said human-machine dialogue member;
said microcontroller being configured to activate or to deactivate each power supply block in said write mode by changing the electrical potential assigned to the associated control line;
said microcontroller being configured to read the state of the electrical contact of each human-machine dialogue member on the associated control line in said read mode.

2. The control module according to claim 1, wherein the power supply block includes a current generator and a control block for controlling said current generator, connected between the current generator and the associated control line.

3. The control module according to claim 1, wherein the control block includes a transistor having a base that is connected to the control line via a resistor.

4. The control module according to claim 2, wherein the current generator is connected between two power supply lines forming the second power supply source, a first power supply line at nonzero potential and a reference line at zero potential.

5. The control module according to claim 4, comprising a pull-down resistor that is connected to the control line and to the reference line.

6. The control module according to claim 4, wherein the microcontroller is connected to said reference line and to a second power supply line, forming the first electrical power supply source.

7. The control module according to claim 1, comprising a resistor, referred to as the read resistor, placed in series on the control line.

8. A human-machine dialogue system comprising a control module and a plurality of human-machine dialogue members that are connected to said control module, each human-machine dialogue member comprising a functional element provided with an electrical contact and/or a signalling indicator, between a first terminal that is connected to a common line and a second terminal that is connected to a distinct control line generated by said control module, wherein the control module is in accordance with that defined in claim 1.

9. The system according to claim 8, wherein the human-machine dialogue members are connected to said control module by twisted wiring.

10. The system according to claim 8, wherein the indicator is a light indicator and includes at least one light-emitting diode.

11. The system according to claim 8, wherein each human-machine dialogue member includes a diode that is connected in series with said electrical contact.

* * * * *